United States Patent [19]

Wize

[11] 4,093,275
[45] June 6, 1978

[54] SEAT BELT SECURING DEVICE

[75] Inventor: Gary A. Wize, Washington, Mich.

[73] Assignee: General Motors Corporation, Detroit, Mich.

[21] Appl. No.: 776,626

[22] Filed: Mar. 11, 1977

[51] Int. Cl.² ............................................. A62B 35/00
[52] U.S. Cl. .................................... 280/747; 297/389; 24/241 PS
[58] Field of Search .............. 280/744, 747; 180/82 C; 24/241 PS, 241 SL, 232, 230 AT, 164; 297/389, 388

[56] References Cited

U.S. PATENT DOCUMENTS

| | | | |
|---|---|---|---|
| 3,013,517 | 12/1961 | Isham | 114/230 |
| 3,179,997 | 4/1965 | Jalinaud | 24/230 |
| 3,294,444 | 12/1966 | Anderson | 24/230 AT |
| 3,311,188 | 3/1967 | Gutshall | 24/230 AT X |
| 3,598,443 | 8/1971 | Stoffel et al. | 297/389 |
| 3,820,842 | 6/1974 | Stephenson | 280/747 X |
| 3,952,382 | 4/1976 | Vaage | 24/230 AT X |
| 3,979,803 | 9/1976 | Clarke et al. | 24/248 D |
| 3,981,535 | 9/1976 | Henderson et al. | 297/389 |

Primary Examiner—Joseph F. Peters, Jr.
Assistant Examiner—Norman L. Stack, Jr.
Attorney, Agent, or Firm—Charles E. Leahy

[57] ABSTRACT

An occupant restraint system includes a belt having one end anchored outboard the seat and adjacent the lap of the occupant with the other end anchored outboard the seat and adjacent the shoulder of the occupant. At least one of the belt anchorages is provided by a retractor having a windup spring for winding the belt to a vertically extending stored position. A belt securing device mounted inboard the occupant includes a housing having pivotally mounted tong arms for capturing encirclement of the belt. A spring acts on the tong arms to bias the tong arms to an open spaced-apart belt-releasing position. An actuating member is slidably mounted on the housing and has an actuating bar positioned between the tong arms. Movement of the actuating bar by the occupant or the belt as the belt is entered between the tong arms pivots the tong arms to a closed position of belt capturing encirclement. A releasable latch member is pivotally mounted on the housing and has a latch spring acting thereon to urge a portion into blocking engagement of abutment surfaces on the tong arms to block return of the tong arms to the open position.

8 Claims, 10 Drawing Figures

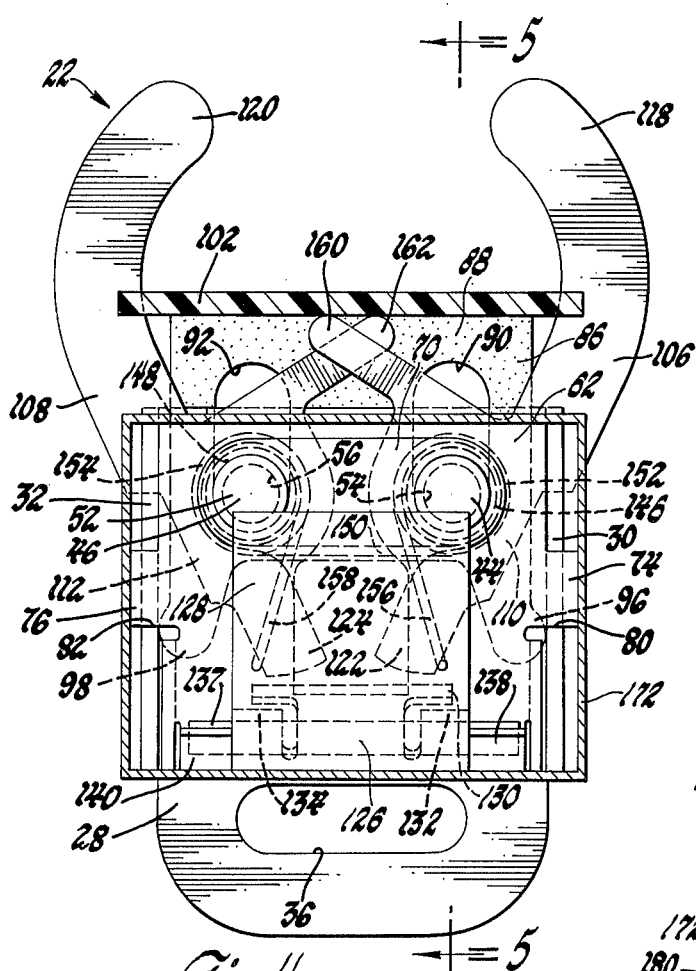
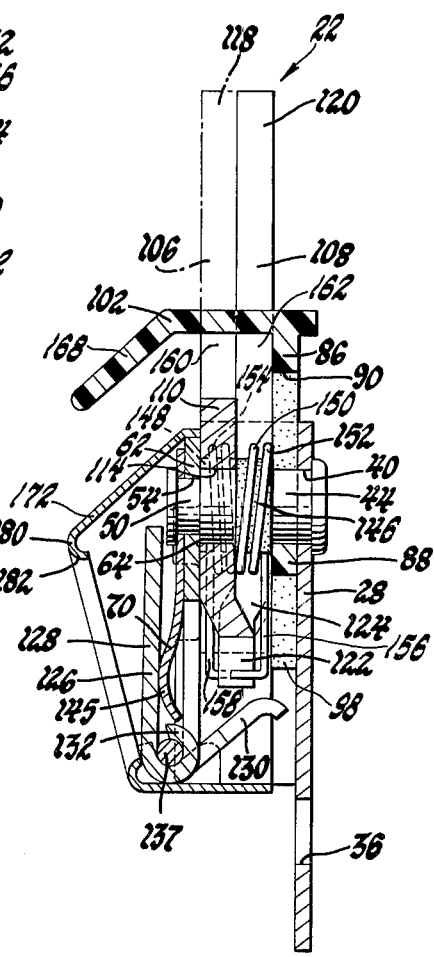
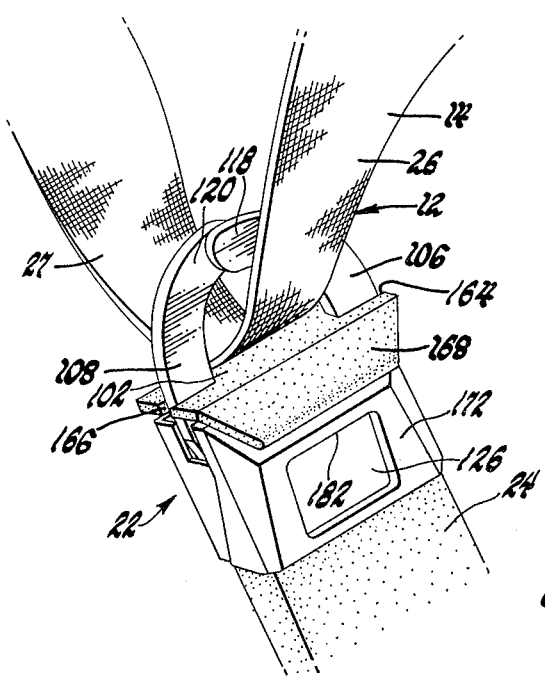

SEAT BELT SECURING DEVICE

The invention relates to an improved seat belt system and a securing device for releasably securing the belt in an occupant restraining position.

Occupant restraining seat belt systems for motor vehicles commonly employ a shoulder belt which extends over the shoulder and across the chest of the seated occupant as well as a lap belt which extends across the lap of the occupant. One type of well known seat belt system is a three-point belt system comprising a loop of belt having its lower end attached to the vehicle floor outboard the occupant seating position and its upper end attached to the vehicle body at the roof rail or door pillar. A seat belt retractor provides the attachment of one or both of the belt ends to the body to wind the belt to a stored position wherein the belt extends vertically along the pillar.

Typical seat belt systems employ a device for securing the belt in the restraining position which comprises a latch plate assembly mounted on the belt intermediate the ends and engageable with a buckle mounted inboard of the occupant seating position. The latch plate assembly divides the seat belt into a shoulder belt portion and a lap belt portion and may be secured at a fixed position on the belt or may be slidably movable on the belt. The seat belt retractor utilized in such seat belt systems commonly have a relatively strong windup spring which provides a winding effort sufficient to wind a substantial portion of the belt onto a reel and suspend the weight of the latch plate assembly in a readily accessible stored position extending vertically between the end of the seat and the body pillar.

Other known seat belt systems employ a securing device which includes a frame which defines an elongated opening for receiving the belt, a bar pivoted to the frame, and a latch for locking the bar in a position in which the bar closes the elongated opening to capture the belt. In such systems there is no hardware carried on the belt loop, but securement of the belt requires the use of both hands i.e., one hand to position the belt and one hand to pivot the bar to the latched position.

It is desirable in the interest of automotive safety that seat belt systems offer a maximum of comfort and convenience in order to encourage utilization of the seat belts by the motoring public.

Accordingly, it is advantageous that the belt securing device be configured for engagement and disengagement by the seat occupant with a minimum of visual orientation so that the utilization of the belt system becomes habitual and requires little conscious effort by the seat occupant.

It is also advantageous that the securing device be engageable and disengageable by a one-handed operation.

Furthermore, it is advantageous that the belt be secured in the occupant restraint position independently of any element carried on the belt so that the windup spring need not have a capacity sufficient to lift the latch plate assembly or a like securing element carried by the belt and the comfort of the occupant is not impaired by a large belt effort applied against the body.

According to the invention, an occupant restraint system includes a belt having one end anchored outboard the seat and adjacent the lap of the occupant with the other end anchored outboard the seat and adjacent the shoulder of the occupant. At least one of the belt anchorages is provided by a retractor for winding the belt to a stored position extending vertically at the end of the seat back to permit ease of occupant ingress and egress from the seat. A belt securing device is mounted on the vehicle body inboard the occupant seating position and includes a housing having pivotally mounted tong arms each having a curved arm portion extending outwardly therefrom for capturing encirclement of the belt. A spring acts on the tong arms to bias the curved arm portions to an open spaced-apart belt-releasing position. An actuating member is slidably mounted on the housing and has an actuating bar positioned between the curved arm portions of the tong arms and in the path of entry of the belt therebetween. Each of the tong arms has an operating leg which extends into engagement with the actuating bar of the actuating member so that movement of the actuating bar relative the housing by the occupant or the belt as the belt is entered between the tong arms pivots the tong arms against the spring bias to carry the curved arm portions to a closed position of belt capturing encirclement. A latch member is pivotally mounted on the housing and has a latch spring acting thereon to urge a latch portion into blocking engagement of abutment surfaces on the tong arms to block return of the tong arms from the closed position to the open position. The latch member also has a button portion by which the seat occupant may pivot the latch member against the bias of the latch spring to move the latch portion from blocking engagement of the abutment surfaces and allow the spring to pivot the tong arms to the open position to release the belt for return to the stored position by the seat belt retractor.

One object, feature and advantage of the invention is the provision of a seat belt securing device having pivotally mounted tong arms for capturing a restraint belt independently of any cooperating securing element mounted on the belt and an actuating device for closing the tong arms about the belt upon entry of the belt between the arms.

A further object, feature and advantage of the invention is the provision of a belt securing device having a pair of tong arms for capturing a belt and an actuating member positioned in the path of entry between the tong arms for closing the tong arms about the belt.

Another object, feature and advantage of the invention is the provision of a belt securing device having pivotally mounted tong arms for capturing the belt, an actuating member for closing the tong arms, and push button operated latch means for selective operator actuation to open the tong arms and release the belt for movement to a stored position.

A still further object, feature and advantage of the invention is the provision of a three-point single loop belt system which facilitates one-handed securement of the belt in an occupant restraint position by provision of a securing device having pivotally mounted tong arms and an actuator positioned in the path of entry of the belt between the tong arms to close the tong arms in capturing encirclement of the belt.

These and other objects, features and advantages of the invention will become apparent upon consideration of the specification and the appended drawings in which:

FIG. 4 is a view similar to FIG. 2 but showing the belt securing device in its open belt-releasing position;

FIG. 5 is a sectional view taken in the direction of arrows 5—5 of FIG. 4;

FIG. 6 is an enlarged fragmentary view similar to FIG. 1 but showing the belt securing device in its closed position of belt capturing encirclement.

Figure 1:
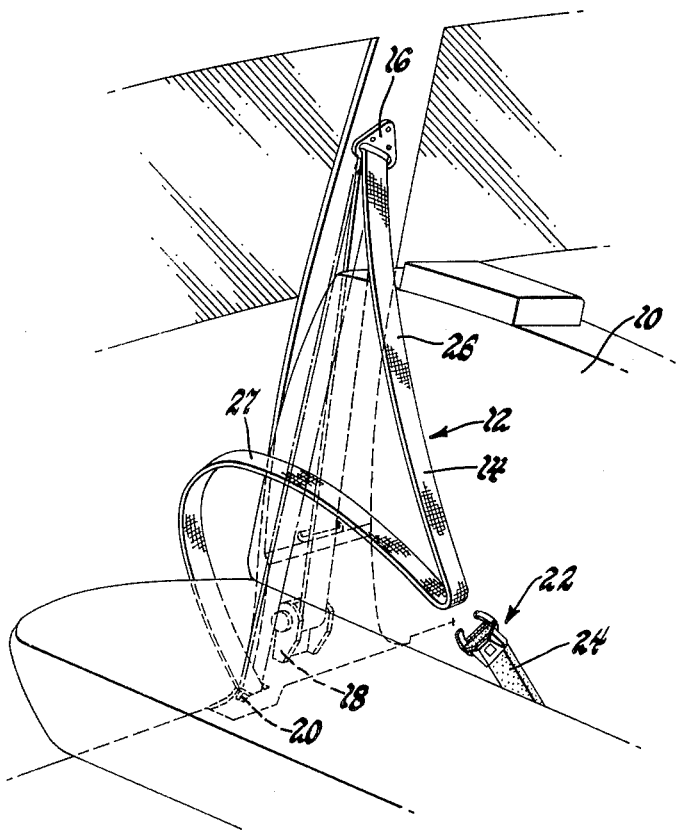
FIG. 1 is a perspective view of a seat belt system embodying the invention.

Referring to FIG. 1, there is shown a vehicle occupant compartment wherein the vehicle seat 10 is conventionally arranged. A seat belt system, generally indicated at 12, is provided for restraining a vehicle occupant in the seated position.

The seat belt system 12 includes a single loop of seat belt 14 which has its upper end slidable through an anchor loop 16 attached to the pillar and extending downwardly parallel with the pillar for connection to an inertia responsive seat belt retractor 18. The other end of the seat belt 14 is conventionally attached to the vehicle body floor pan or body sill by an anchor bracket 20. The retractor 18 winds the belt 14 to the phantom-line indicated position of FIG. 1 wherein the belt is stored in a vertically extending position at the end of the seat to permit ease of occupant ingress and egress.

A seat belt securing device, generally indicated at 22, is located inboard the occupant seating position and is attached to the vehicle body by a length of strap 24. The securing device 22 encircles and captures the belt 14 in the occupant restraint position wherein the belt 14 is divided into a shoulder belt portion 26 diagonally positioned across the chest of the occupant and a lap belt portion 27 which crosses the lap of the occupant.

Figure 2:
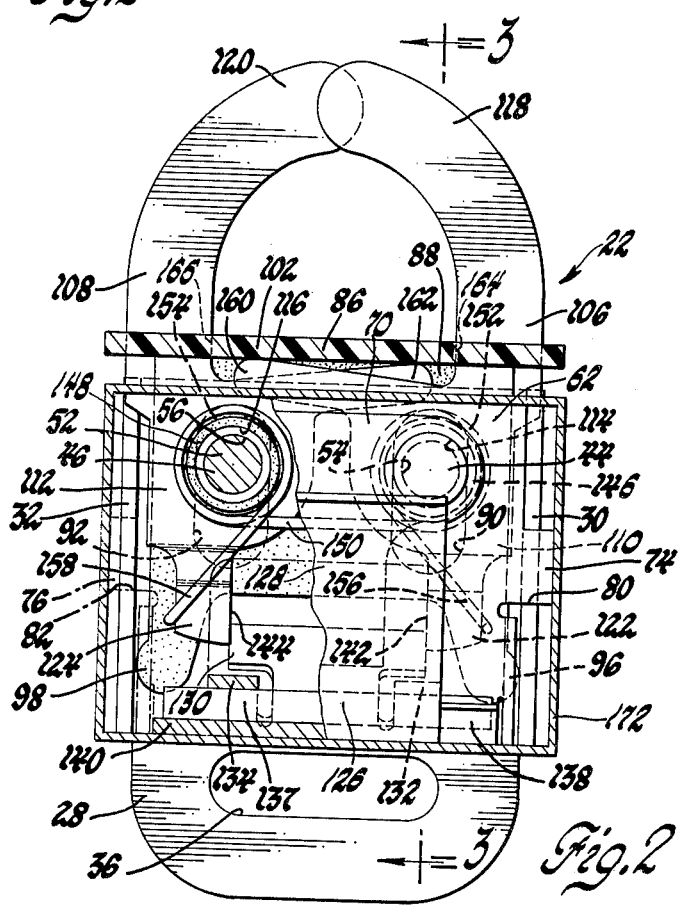
FIG. 2 is a plan view having parts broken away in section of a belt securing device according to the invention and shown in the closed position for capturing encirclement of a seat belt.
Figure 3:
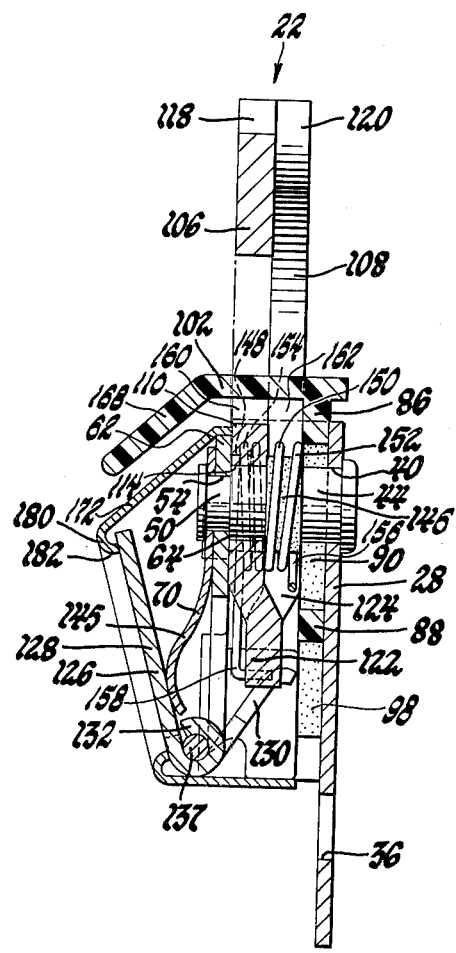
FIG. 3 is a sectional view taken in the direction of arrows 3—3 of FIG. 2.

Referring to FIGS. 2 and 3, it is seen that the securing device 22 includes a sheet metal stamped housing base 28 having laterally spaced upstanding sidewalls 30 and 32. The lower end of the housing base 28 has a slot 36 for receiving the strap 24 of FIG. 1. The housing base 28 also has an aperture 40 which receives a headed mounting pin 44. A like aperture receives a headed mounting pin 46. The distal ends 50 and 52 of the pins 44 and 46 extend through aligned apertures 54 and 56 of a housing plate 62 and are necked down to provide shoulders 64 which engage against the housing plate 62. The distal ends of the pins also extend through aligned apertures of a leaf spring 70. The distal ends of the pins 44 and 46 are peened over or receive a screw by which the leaf spring 70 and housing plate 62 are mounted in parallel extending spaced relation from the housing base 28. The housing plate 62 also has lateral tabs 74 and 76 which extend into mating recesses 80 and 82 of the upstanding sidewalls 30 and 32 to provide a further supporting connection between the housing plate 62 and housing base 28.

An actuating member 85 is mounted for sliding movement relative the housing. As seen in FIGS. 2 and 3, the actuating member 86 is of injection molded plastic and has a base plate 88 which bears on the housing base 28. The base plate 88 has slots 90 and 92 which are aligned with the pins 44 and 46 to permit sliding movement of the actuating member 86 relative the housing. As seen in FIG. 2, the actuating member also has lateral shoes 96 and 98 which bear against the upstanding legs 30 and 32 of housing base 28 to guide the sliding movement of actuating member 86. The actuating member 86 has an integral actuating bar 102, which extends laterally from the base plate 88, as will be discussed hereinafter.

Referring to FIG. 6, it is seen that the securing device 22 includes a pair of tong arms 106 and 108 which encircle and capture the belt 14. As best seen in FIGS. 2 and 3, the tong arms 106 and 108 respectively include central portions 110 and 112 having apertures 114 and 116 which permit their respective engagement over the pins 44 and 46 in interposition between the base plate 88 of actuating member 86 and the housing plate 62. The tong arms 106 and 108 have respective outwardly extending arms 118 and 120 which curve toward one another and assume a closed position as shown in FIGS. 2 and 6 for capturing encirclement of the belt 14. The tong arms 106 and 108 also have respective inner arms 122 and 124 which are bent into a common plane and assume the spaced apart position of FIG. 2 when the arms 118 and 120 are in their closed positions.

A latch member 126 is provided to maintain the tong arms 106 and 108 in their closed positions of FIG. 2. As best seen in FIG. 3, the latch member 126 includes a push button portion 128 and a latching portion 130. The latch member 126 has laterally spaced curled tabs 132 and 134 which encircle a pivot shaft 137 which extends outwardly each end of the latch member 126. The housing plate 62 has similar but oppositely curled tabs 138 and 140 which encircle the outward projecting ends of pivot pin 136 so that the latch member 126 is mounted for pivotal movement between a position of FIGS. 2 and 3 in which the latching portion 130 extends into blocking engagement of abutment surfaces 142 and 144 provided on the inner arms 122 and 124 of the arms 106 and 108. The leaf spring 70 has a curled leaf 145 which biases and maintains the latch member 126 in the normal position of FIGS. 2 and 3 but yields to permit pivotal motion of the latch member 126 to the position of FIG. 5 wherein the latching portion 130 is withdrawn from blocking engagement between the abutment surfaces 142 and 144 of tong arm inner portions 122 and 124 to permit pivotal motion of the tong arms to their open spaced-apart belt-releasing position shown in FIG. 4.

As seen in FIG. 3, the central portions 110 and 112 and arms 118 and 120 of the tong arms 106 and 108 are disposed in offset planes so that the tips of the arms 118 and 120 overlie one another. As best seen in FIG. 3, a plastic spacer sleeve 146 encircles pin 44 and seats against base plate 88 of actuating bar 102 and the central portion 110 of tong arm 106 to maintain the position of tong arm 106. A like spacer sleeve 148 encircles mounting pin 46 and acts between tong arm 108 and the housing plate 62 to maintain the position of tong arm 108. The spacer sleeves 146 and 148 are preferably of an anti-friction material such as Teflon.

A torsion spring assembly 150 has a pair of separate coils 152 and 154 which respectively encircle the pins 44 and 46 and have legs 156 and 158 extending into respective engagement of the inner arms 122 and 124 to simultaneously bias the tong arms 106 and 108 to their open belt-releasing positions of FIG. 4. It is desirable that coil 152 serve as a compression spring to exert a light effort on the actuating member 86 to prevent rattles.

As best seen in FIG. 4, the tong arms 106 and 108 have respective operating legs 160 and 162 which project from the respective central portions 110 and 112 into engagement of the actuating bar 102 of the actuating member 86. Furthermore, as best seen in FIG. 6, the outer ends of the actuating bar 102 has notches 164 and 166 which respectively receive the tong arms 106 and 108 to accommodate their pivotal movement between the open position of FIG. 2 and closed position of FIGS. 4 and 6. The actuating bar 102 also has a curved thumb button 168 which curves toward the latch member 126.

It will be appreciated that the relative motion between the actuating member 86 and the tong arms 106 and 108 is coordinated by the torsion spring assembly 150 and the tong arm operating legs 160 and 162 which engage the actuating bar 102. For example, as seen in FIG. 4, the effort of the torsion spring assembly 150 urges the tong arms to their open spaced-apart position wherein the operating legs 160 and 162 maintain the actuating member 186 in an extended position so that the actuating bar 102 partially closes the space between the tong arms 106 and 108. Furthermore, retracting movement of the actuating member 86 causes the actuating bar 102 to forcibly bear on the tong arm operating legs 160 and 162 so that the tong arms 106 and 108 are pivoted relative one another to their closed positions of FIG. 2.

As best seen in FIGS. 2 and 3, a stamped sheet metal cover 172 encloses the latch member 126. The cover 172 also has a flange 180 defining an opening 182 which provides access to the push button portion 128. The flange 180 provides a stop for the push button portion 128.

OPERATION

Figure 7:
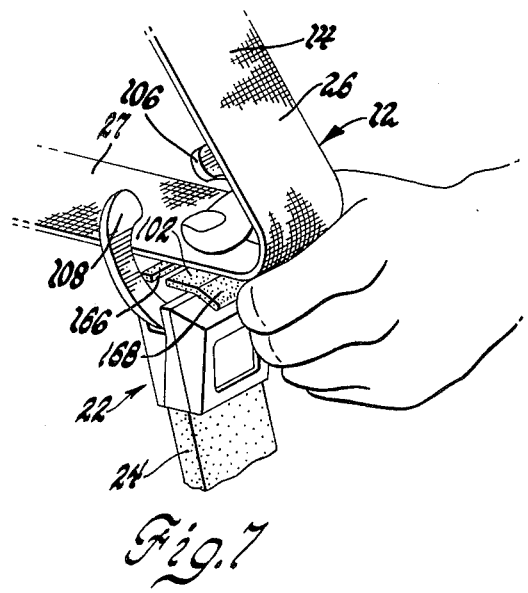
FIGS. 7 - 10 disclose the various methods by which the seat occupant may effect securement of the belt by the belt securing device.
Figure 8:
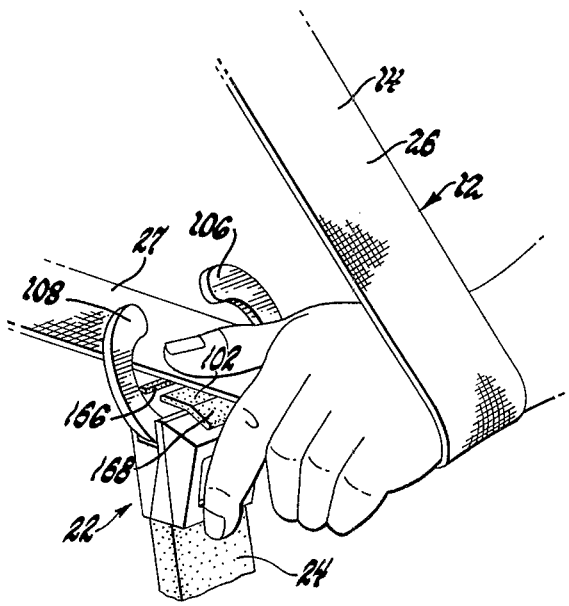

Referring again to FIG. 1, it will be understood that the occupant seating position shown is at the right hand or passenger side of the vehicle. The seat belt 14 is normally stored in the phantom-line indicated position extending vertically along the pillar. When an occupant enters the seat and wishes to engage the belt system in its restraining position, the occupant turns somewhat toward the pillar and reaches with his left hand to grasp the belt. The belt 14 is conveniently looped over the thumb as seen in FIG. 7 so that the belt slides over the thumb as the belt is unwound from retractor 18 and pulled through the anchor loop 16. The thumb divides the belt 14 into a shoulder belt portion 26 and a lap belt portion 27. The belt can also be looped over the wrist as seen in FIG. 8. As seen in FIG. 4, the actuating bar 102 of the actuating member 86 extends outwardly of the housing and partially fills the open space between the tong arms 106 and 108. The actuating member 86 is maintained in this extended position by the cooperative effort of the engagement of the operating legs 160 and 162 with the actuating bar 102 and the bias of the torsion spring assembly 150 which holds the tong arms in their open spaced-apart position of FIG. 4.

The occupant enters the belt 14 between the tong arms 106 and 108 as seen in FIGS. 7 and 8. The tong arms 106 and 108 are then moved from their open spaced-apart position of FIG. 4 to the closed position of belt capturing encirclement of FIG. 2 by the application of force against the actuating bar 102 of the actuating member 86. This actuating force may be applied by the thumb as it bears on the thumb button 168 through the intermediary of the belt as seen in FIG. 8 or it may be applied by the belt by thrusting the belt in the downward direction as seen in FIG. 7 so that the belt forcibly bears against the actuating bar 102. In either case, the sliding movement of the actuating member 86 in the retracting direction with respect to housing moves the operating legs 160 and 162 to pivot the tong arms 106 and 108 about the pins 44 and 46 to the closed position of FIG. 2 wherein the latch member 126 is pivoted by leaf spring 70 to carry its latching portion 130 into blocking engagement of the abutment surfaces 142 and 144 of the tong arms. Accordingly, it is seen that the belt 14 may be conveniently engaged in the securing device 22 by a one-handed operation.

Figure 9:
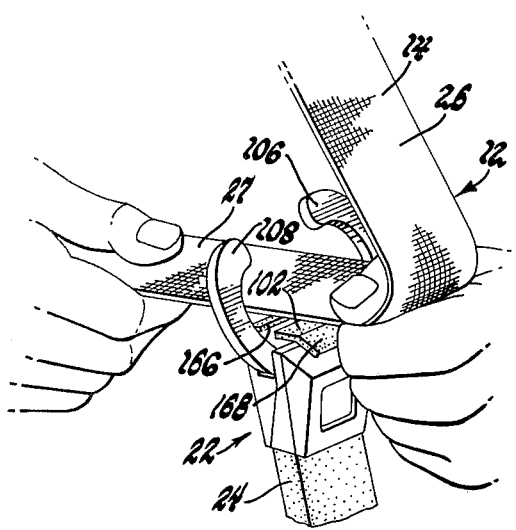
Figure 10:
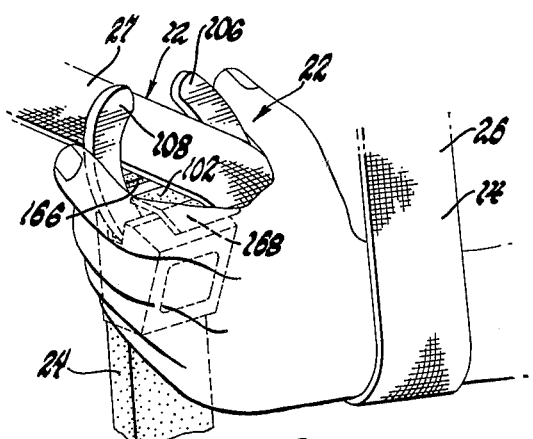

The occupant may also engage the belt in the securing device 22 by using one hand to position the belt between the tong as seen in FIG. 9 and then using the other hand to apply force against the actuating member 86, either by thrusting the belt as seen in FIG. 9 or by bearing directly on the thumb button 168. Furthermore, the fingers of either hand may squeeze together the tong arms 106 and 108 as seen in FIG. 10.

When the occupant wishes to alight from the vehicle, the latch member 126 is pivoted to its position of FIG. 5 by pressing against the push button portion 128 with the thumb. Movement of the latch member 126 to the position of FIG. 5 removes the latching portion 130 from blocking engagement between the abutment surfaces 144 and 146 of the tong arms. The torsion spring assembly 150 may then pivot the tong arms 106 and 108 from their closed position of FIG. 2 to the open position of FIG. 4 which releases the belt for movement to the stored position by the winding effort of retractor 18. Opening movement of the tong arms 106 and 108 causes their respective operating legs 160 and 162 to extend the actuating member 86 outwardly from the housing to the extended position of FIG. 4 in readiness for a subsequent donning of the restraint belt.

Accordingly, it is seen that the invention provides a securing device and a belt system therefor which facilitates one-handed securement of the belt loop in a restraining position in response to belt entry between belt capturing tong arms independently of any cooperating securing elements mounted on the belt to thereby permit winding of the belt to the stored position by a low effort retractor which enhances occupant comfort.

The embodiments of the invention in which an exclusive property or privilege is claimed are defined as follows:

1. An occupant restraint system for a motor vehicle body having an occupant seat and comprising: a belt, means anchoring one end of the belt outboard the seat and adjacent the lap of the occupant and the other end of the belt outboard the seat and adjacent the shoulder of the occupant, one of the belt anchoring means being a retractor for winding up the belt to a vertically extending stored position outboard the seat to permit ease of occupant ingress and egress, a belt securing device connected to the vehicle body inboard the occupant, said securing device having a pair of tong arms pivotally mounted for movement to a closed position for capturing encirclement of the belt, spring means biasing the tong arms to an open spaced-apart belt-releasing position, an actuating member positioned between the tong arms and operably connected therewith for pivoting the tong arms against the bias of the spring to a closed position for capturing encirclement of the belt upon forced movement of the actuating member during one-handed entry of the belt between the tong arms, and releasible latch means operative on the tong arms for maintaining the tong arms in the closed position of belt capturing encirclement.

2. An occupant restraint system for a motor vehicle body having an occupant seat and comprising: a belt having ends, means anchoring the ends of the belt on one side of the seat with one end adjacent the lap of the occupant and the other end adjacent the shoulder of the occupant, the anchoring means associated with one end of the belt being a retractor for winding up the belt to a vertically extending stored position on the one side of the seat to permit ease of occupant ingress and egress, a belt securing device having a housing connected to the vehicle body on the other side of the seat from the anchoring means, said securing device having a pair of tong arms pivotally mounted on the housing for movement between a closed position for capturing encirclement of the belt and an open spaced-apart belt-releasing position, spring means biasing the tong arms to the open spaced-apart belt-releasing position, an actuating member movably mounted on the housing and operably associated with the tong arms so that movement of the actuating member relative the housing pivots the tong arms against the bias of the spring means to the closed position for capturing encirclement of the belt to position the belt in occupant restraining position across the lap and chest of the seat occupant, releasible latch means operative on the tong arms for maintaining the tong arms in the closed position of belt capturing encirclement, and a push button release means for disabling the latch means to release the tong arms for movement to the open spaced-apart belt-releasing position permitting the retractor to wind the belt to the stored position.

3. In a vehicle body seat belt system having a loop of restraint belt, a securing device for releasibly capturing the belt in restraining position about the occupant independently of any cooperating securing element carried on the belt and comprising: a housing mounted on the vehicle body, first and second tong arms pivotally mounted on the housing and having belt capturing curved arm portions extending outwardly of the housing for capturing encirclement of the belt, spring means acting on the tong arms to bias the curved arm portions into an open spaced-apart belt-releasing position, an actuating member movably mounted on the housing and extending outwardly therefrom in the path of entry of the belt between the tong arms, said actuating member being cooperably associated with the tong arms so that movement of the actuating member relative the housing by the occupant or the belt pivots the tong arms against the bias of the spring means to a closed position encircling and capturing the belt in the restraining position, and releasible latch means operative on the tong arms for maintaining the tong arms in the closed position.

4. In a vehicle body seat belt system having a loop of restraint belt, a securing device for releasibly capturing the belt in restraining position about the occupant independently of any cooperating securing element carried on the belt and comprising: a housing, first and second tong arms pivotally mounted on the housing and having belt capturing curved arm portions extending outwardly of the housing for capturing encirclement of the belt, spring means acting on the tong arms to bias the curved arm portions to an open spaced-apart belt-releasing position, an actuating member slidably mounted on the housing and being cooperably associated with the tong arms so that movement of the actuating member relative the housing pivots the tong arms against the bias of the spring means to a closed position encircling and capturing the belt in the restraining position, said actuating member having an actuator bar positioned between the tong arms and in the path of entry of the belt between the tong arms and a thumb button extending laterally of the actuating bar for engagement by the belt or thumb to move the actuating member, and latch means for maintaining the tong arms in the closed position, said latch means having a push button release means for disabling the latch means to release the tong arms for movement by the spring means to open spaced-apart belt-releasing position.

5. In a vehicle body seat belt system having a loop of restraint belt, a securing device for releasibly capturing the belt in a restraining position extending across the body of a seat occupant, comprising in combination: a housing mounted on the vehicle body, a pair of tong arms pivotally mounted on the housing for movement between a closed position of belt capturing encirclement and an open spaced-apart belt-releasing position, an actuating member having an actuating bar positioned between the tong members and a body portion slidably mounted within the housing to enable movement between a retracted position and an extended position wherein the actuating bar partially fills the space between the tong members, and motion coordinating means acting between the members such that the tong members are in the open position when the actuating member is in the extended position and the tong members are in the closed position when the actuating member is in the retracted position, said motion coordinating means including spring means urging the tong members to the open position and the actuating member to the extended position.

6. In a vehicle body seat belt system having a loop of restraint belt, a securing device for releasibly capturing the belt in a restraining position extending across the body of a seat occupant comprising in combination: a housing connected with the vehicle body, a pair of tong arms, a pair of laterally spaced pivot means mounted on the housing and respectively mounting the tong arms for pivotal movement between closed belt-capturing positions and open spaced-apart belt-releasing positions, an actuating member having an actuating portion positioned between the tong arms and in the path of entry of the belt between the tong arms, said actuating member having a base wall and spaced-apart slots in the base wall for receiving the pivot means to define a path of sliding movement of the actuating member relative the housing, means acting between the tong arms and the actuating member to move the actuating member in the direction to partly fill the space between the tong arms as the tong arms are moved to the open position and for forcibly moving the tong arms to the closed position upon sliding movement of the actuating member in the other direction, and releasible latch means operative on the tong arms for maintaining the tong arms in the closed position of belt capturing encirclement.

7. In a vehicle body seat belt system having a loop of restraint belt, a securing device for releasibly capturing the belt in restraining position about the occupant, said securing device comprising: a housing mounted on the vehicle body, a pair of tong members pivotally mounted on the housing and having arm portions extending outwardly of the housing and curved toward one another to define a space therebetween for capturing encirclement of the belt, and pivot means mounting the tong members on the housing for pivotal movement about spaced parallel axes between an open spaced-apart belt-releasing position and a closed position for capturing the belt in the occupant restraining position, spring means acting to bias the tong members to an open spaced-apart belt-releasing position, an actuating member slidably mounted on the housing for movement between an extended position and a retracted position and having an actuating portion positioned between the curved arm portions of the tong members, and motion coordinating means acting between the members and including spring means urging the tong members to the open position and the actuating member to a position extending outwardly the housing so that the actuating portion partially closes the space between the tong members and an operating leg on at least one of the tong members extending into engagement with the actuating portion so that movement of the actuating member from the extended position to the retracted position effects pivotal movement of the tong members to a closed position encircling and capturing the belt in the occupant restraining position, and releasible latch means for maintaining the tong members in the closed position.

8. In a vehicle body seat belt system having a loop of restraint belt, a securing device for releasibly capturing the belt in restraining position about the occupant, said securing device comprising: a housing mounted on the vehicle body; first and second tong arms; each of said tong arms having an intermediate portion pivotally mounted on the housing, a curved arm portion extending outwardly of the housing for capturing encirclement of the belt, and an abutment surface opposite the curved arm portions and situated internally of the housing; spring means acting on the tong arms to bias the curved arm portions to an open spaced-apart belt-releasing position and the abutment surfaces to a close together relation; an actuating member slidably mounted on the housing and having an actuating bar positioned between the curved arm portions of the tong arms; said tong arms each having an operating leg extending into engagement with the actuating bar so that movement of the actuating bar relative the housing by the occupant or the belt when the belt is entered between the tong arms pivots the curved arm portions to a closed position encircling and capturing the belt; a latch member pivotally journalled on the housing and having a latch portion and a push button portion; a spring acting on the latch member urging the latch portion into blocking engagement between the abutment surfaces of the tong arms to block return of the tong arms from the closed position to the open position, operator actuation of the push button portion pivoting the latch member against the bias of the spring to move the latch portion from blocking engagement of the abutment surfaces allowing the spring means to pivot the arms to the open position to release the belt.

* * * * *